United States Patent [19]
Nummedal et al.

[11] 3,883,437
[45] May 13, 1975

[54] MONOLITHIC IR DETECTOR ARRAYS WITH DIRECT INJECTION CHARGE COUPLED DEVICE READOUT

[75] Inventors: Kjell Nummedal, Los Angeles; Donald J. Holscher, Playa del Rey; John M. Hartman, Costa Mesa; Darrell M. Erb, Newport Beach, all of Calif.

[73] Assignee: Hughes Aircraft Company, Culver City, Calif.

[22] Filed: Jan. 25, 1974

[21] Appl. No.: 436,586

[52] U.S. Cl. .................................. 250/332; 250/334
[51] Int. Cl. .............................................. G01t 1/24
[58] Field of Search ........... 250/330, 332, 334, 338, 250/339, 340, 347; 307/221 R, 221 C, 221 D

[56] References Cited

UNITED STATES PATENTS

| | | | |
|---|---|---|---|
| 3,715,485 | 2/1973 | Weimer | 178/7.1 |
| 3,771,149 | 11/1973 | Collins et al. | 317/235 R |
| 3,806,729 | 4/1974 | Caywood | 250/339 |
| 3,808,435 | 4/1974 | Bate et al. | 250/332 |

*Primary Examiner*—James W. Lawrence
*Assistant Examiner*—Davis L. Willis
*Attorney, Agent, or Firm*—W. H. MacAllister; J. E. Szabo

[57] ABSTRACT

Signals generated by an image-scanned array of infrared (IR) radiation detectors are injected directly into a set of charge-coupled device (CCD) shift registers for subsequent processing.

9 Claims, 11 Drawing Figures

MONOLITHIC IR DETECTOR ARRAYS WITH DIRECT INJECTION CHARGE COUPLED DEVICE READOUT

BACKGROUND OF THE INVENTION

The present invention relates generally to focal plane arrays of infrared detectors and more particularly to the provision of charge-coupled device signal processing circuitry integrated with such arrays.

When an infrared image is scanned across an array of detectors arranged in a plurality of columns and rows, the signals generated by them appear sequentially across the detector outputs. In the process of producing a display of the scanned image, the signals produced by the detectors must be transferred from the detectors into data processing apparatus where the image may be reconstructed from the signals in a manner determined by the particular mode of scanning employed. In one such type of array disclosed in U.S. Pat. NO. 3,723,642 issued to Peter Laakmann and assigned to the present assignee, a plurality of infrared detectors are arranged in a linear array and the array is scanned relative to an image. The detector array is oriented parallel to the scanning direction, so that each element in the array scans the entire field of view, with each given element of the image successively creating a signal at successive detectors in the array. The output signal from each detector is applied to a different input of a delay line which is so proportioned that the signals produced by all of the detectors in the linear array arrive at the output of the delay line at the same time. Thus, the outputs of all of the detectors are added and variations in their individual response characteristics are averaged out.

The delay line illustrated in the Laakmann patent comprises discrete components such as inductors and capacitors. Such components do not lend themselves to integration with a detector array. A preferable alternative, where miniaturization and integration are desired is offered by a new type of integrated circuit, the charged-coupled device which, when properly clocked may be organized into shift registers into successive stages of which signals may be fed for variable delay.

SUMMARY OF THE INVENTION

Accordingly, it is a principal object of the present invention to apply integrated circuit technology to infrared detector arrays so that they may be packaged along with their signal processing circuits in a monolithic format on a small substrate.

A more specific object of the invention is to adapt charge-coupled devices for use as signal processing elements with infrared detector arrays.

It is a further object of the present invention to reduce to a minimum the number and size of components necessary to make the interface between the charge-coupled devices and the infrared detectors in the array.

These and other objects of the invention are attained by a monolithic package whose input is an array of coplanar infrared detectors arranged in columns and rows, each detector being operable to generate an electrical signal in response to infrared radiation. Disposed next to the detectors is a plurality of coplanar multistage charge-coupled devices, each being associated with a respective column of detectors. Successive stages of each charge-coupled device are provided with means for directly injecting a charge into them in response to the signals produced by respective detectors in the detector column associated with particular charge-coupled device. The image to be displayed is scanned across the array of detectors by conventional means so that respective portions of the image are progressively sensed by successive detectors in respective columns of the array. The injected charges are shifted along the charge-coupled devices in synchronism with the scanning of the image and are periodically read out from those devices.

LIST OF FIGURES

Figure 1:
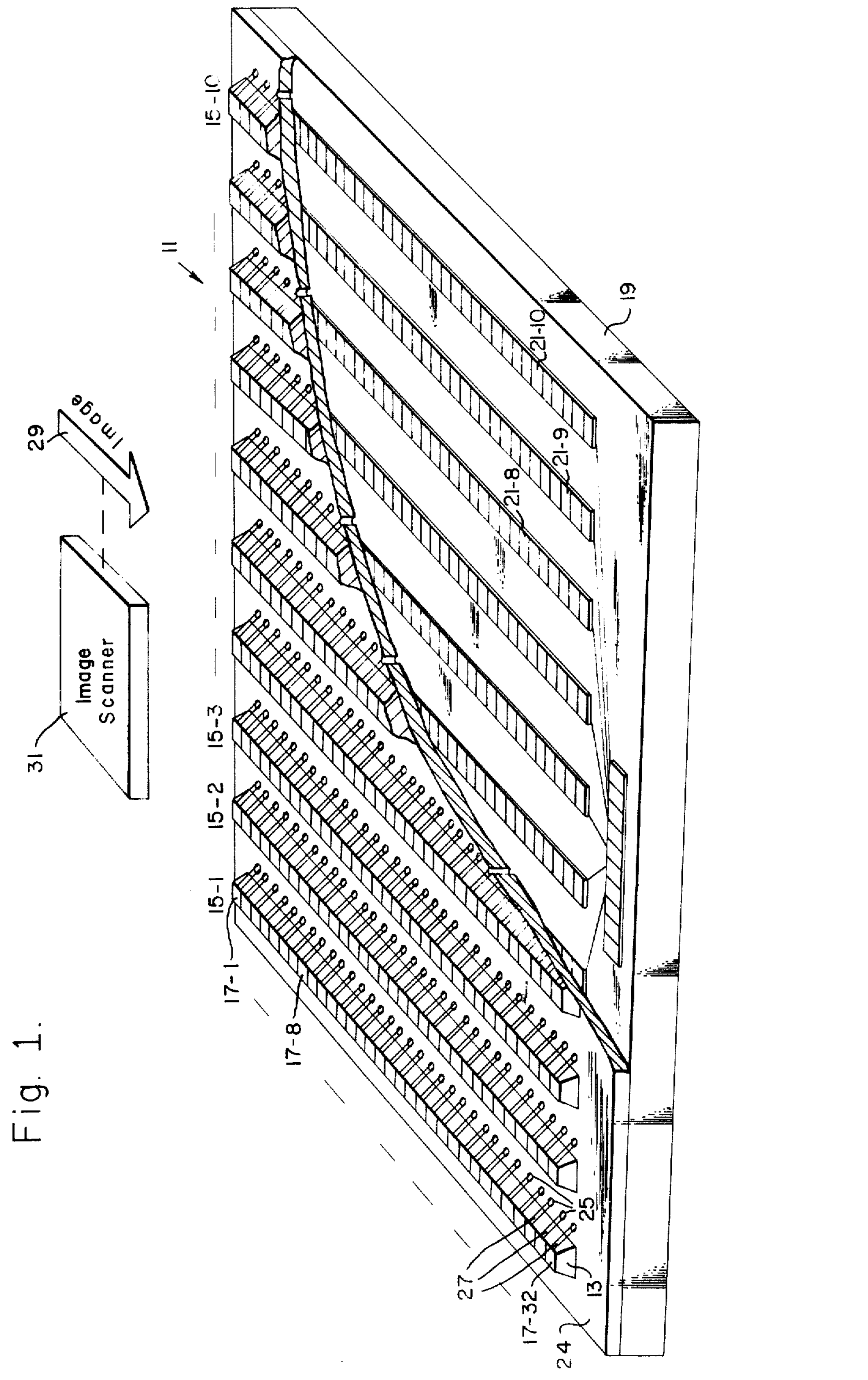
FIG. 1 is a perspective view of an integrated circuit module containing an array of infrared detectors and CCD shift registers for processing signals generated thereby in response to a moving image.
Figure 5:
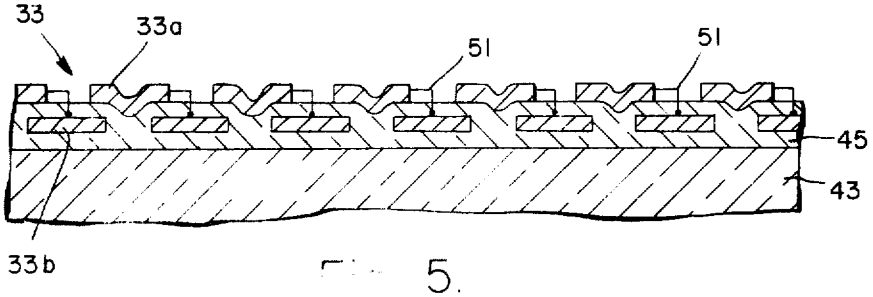
FIG. 5 is a cross section through FIG. 3 along lines 5—5 to show the relative disposition of surface and buried electrodes in the CCD shown in FIG. 3.
Figure 6:
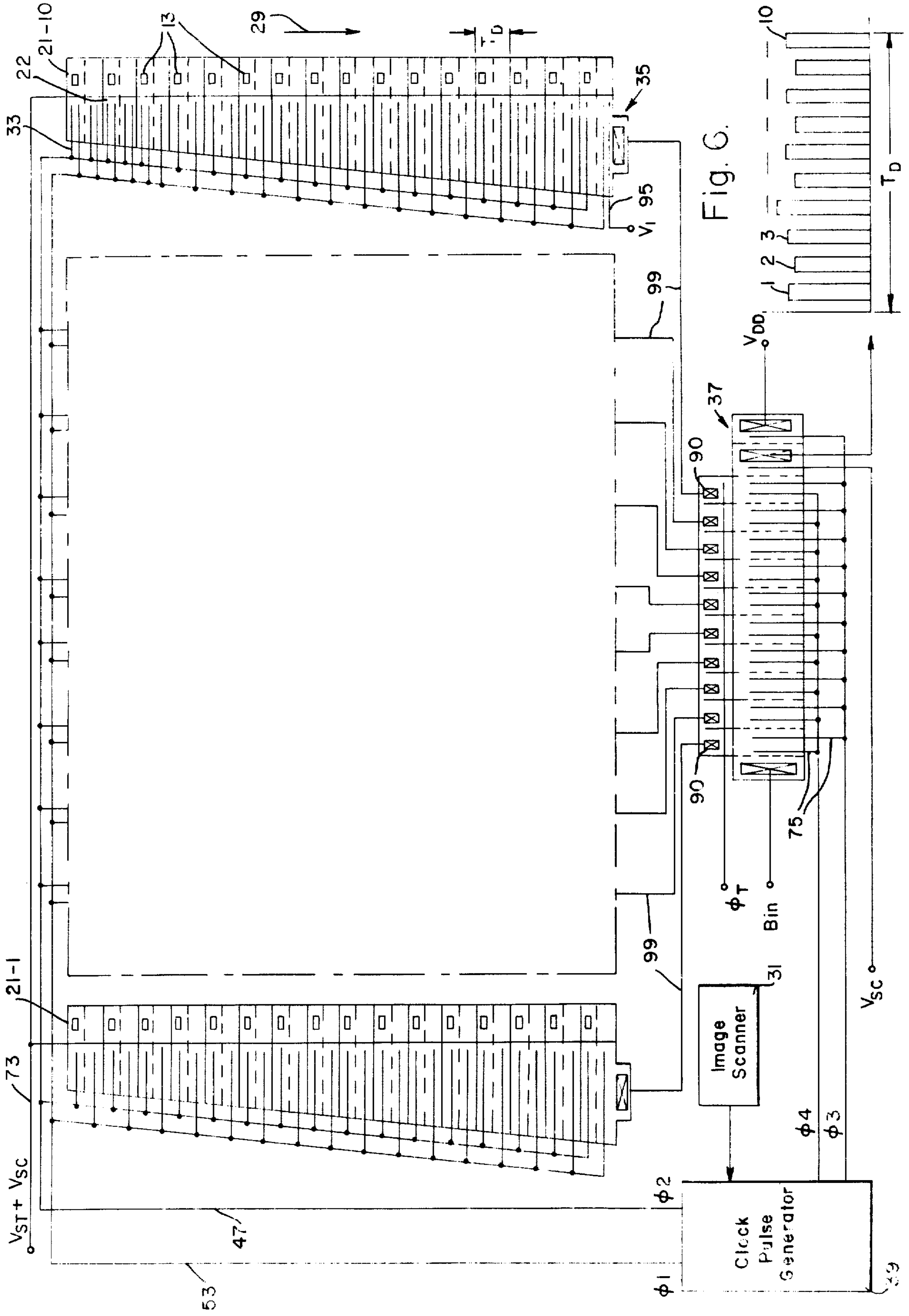
FIG. 6 is a schematic diagram of the integrated circuit module illustrated in FIG. 1.

Turning now to the drawings, a solid state imaging module 11 constructed in accordance with the invention and an imager in which such a module may be employed are shown in FIG. 1 (physically), in FIG. 6 (schematically), and in FIGS. 3, 4, 5, 8, 9, and 11 (in detail). The module 11 comprises a planar array of high impedance (photovoltaic or extrinsic silicon) semiconductor infrared detectors 13 arranged in columns 15-1 through 15-10 and rows 17-1 through 17-32. Formed in a semiconducting substrate 19, adjacent the array of IR detectors is a set of charge coupled devices 21-1 through 21-10, each CCD 21 being located next to a respective column 15 of detectors 13. Each CCD has a plurality of stages 22, there being at least one CCD stage for each IR detector 13 associated with that CCD. The detectors are shown in FIG. 1 to be disposed on top of the semiconducting substrate 19 on a layer of oxide 24. Through a set of openings 25 in the oxide, electrical contact is made from each IR detector 13 through a connecting strip 27 to the particular CCD stage associated with that detector. In keeping with the invention, means are provided for directly injecting a charge into that CCD stage in response to the signal produced by the IR detector 13 connected to that stage.

The imaging module 11 described thus far is used to generate signals which represent an image 29 scanned relative to the module parallel to its detector columns 15 so that respective portions of the image 29 are progressively sensed by successive detectors 13 in those columns. The manner in which scanning of the image 29 relative to the module 11 takes place is immaterial to the invention. Thus, the image may be scanned across the module 19, with the latter being stationary. The means for doing so is illustrated in FIG. 1 as the image scanner 31 in block form, since such scanners are well known in the art. One form such a scanner may take is described and illustrated in U.S. Pat. No. 3,723,642 entitled, "Thermal Imaging System", granted to Peter Laakmann and assigned to the assignee of the present invention.

The scanner described in the Laakmann patent is capable of sweeping an image across an array of detectors in successive strips. For the present application, where the image would be scanned in only one direction as shown in FIG. 1, the Laakmann-disclosed scanner would be suitably modified by eliminating or disabling those of its components which shift the horizontal scan along successive vertical areas. Alternatively, relative movement between image and imaging module may be achieved by traversing the module 11 over the image, with the latter being stationary. This may be the case, for example, where the module 11 is carried on board a vehicle such as an aircraft or a satellite. Moreover, the rate of scan between image and module may be either constant, as in the case of the satellite, or variable, when carried on board an aircraft. What is common to all of the above-mentioned possible alternatives is that the charges injected into the CCD's 21 are shifted along at the same rate as that at which the image is being scanned over the detectors. In this way the charges produced by all detectors in a given column in response to a given portion of the image are added, thereby averaging their individual outputs which may not be absolutely uniform.

Let it be assumed, for example, that the module 11 is carried on board a satellite travelling at a constant rate so that the image 29 moves across it in the direction shown in the figures. Let $T_D$ be the time taken by a given horizontal strip of the image to move the distance between successive detectors 13. With each of the detector columns 15-1 thru 15-10 covering 1/10 of the strip, it will be seen that such a fractional portion of the image will be scanned along successive ones of the detectors 13 in each detector column. As the image travels down the column of detectors, successive ones of them inject a charge into their respective CCD stages. Moreover, by means of shifting electrodes 33 and clock voltages applied thereto, the charge injected by each detector 13 into its associated CCD stage 22 is shifted to the next such stage at the same rate at which the image is scanned over the detectors. As a result, after a time period $N \times T_D$, all of the charges which had been injected into the N stages of the CCD shift register will be deposited in the last such stage so that the amount of charge therein is the sum of all of the charges injected by the detector 13 in response to the fractional portion under consideration.

It will be noted that, with the passing of each time period $T_D$, not only is the particular portion of the image scanned by a distance corresponding to the spacing of the detectors 13 but that the first of the N detectors 13 is also exposed to the next such image portion. Consequently, there appears at the output 35 of each CCD shift register 21 once each time period $T_D$, a signal $C_s$ in the form of a charge which is the sum of the charges produced by all of the detectors 13 in response to a successive fractional portion of the image being scanned. Such a summation signal $C_s$ is presented at the output of each CCD 21 once each time period $T_D$.

Means in the form of an additional CCD shift register 37 is provided to read out, once each time period $T_D$, the charges momentarily at the outputs 35. In accordance with the invention, these charges are injected directly into the multiplexer CCD 37, thus, eliminating the need for intermediate amplifiers. The charges thus injected into the ten stages of the CCD 37 are shifted laterally, so as to dump into the output stage of the CCD 37 in succession the injected summation signals from all ten of the CCD's 21. These ten summation signals, labelled 1–10, are shown to the right of the multiplexer CCD 37. The rate at which the charge is thus shifted along the multiplexing CCD 37 is integrally related to the rate at which it is stepped along the integrating CCDs 21. This ratio for the embodiment illustrated in FIG. 6 is F = Mxf, where F is the shift frequency of multiplexer CCD, M is the number of integrating CCDs and f is the shift frequency of the integrating CCDs.

The shift frequency f of the integrating CCDs 21 is a function of the scanning rate of the image 29. Where the scanning rate is fixed, as in a satellite, the shifting rate is also fixed. An exemplary shift frequency for a typical satellite is one kilohertz. In cases where the scanning rate is variable, as in aircraft, the shifting rate f is also varied as a function of the scanning rate. By means well known, the scanning rate is derived from the image scanner 31 and is used to control the rate of a clock pulse generator 39 from which pulses are applied to the CCDs 21 and 37.

Figure 2:
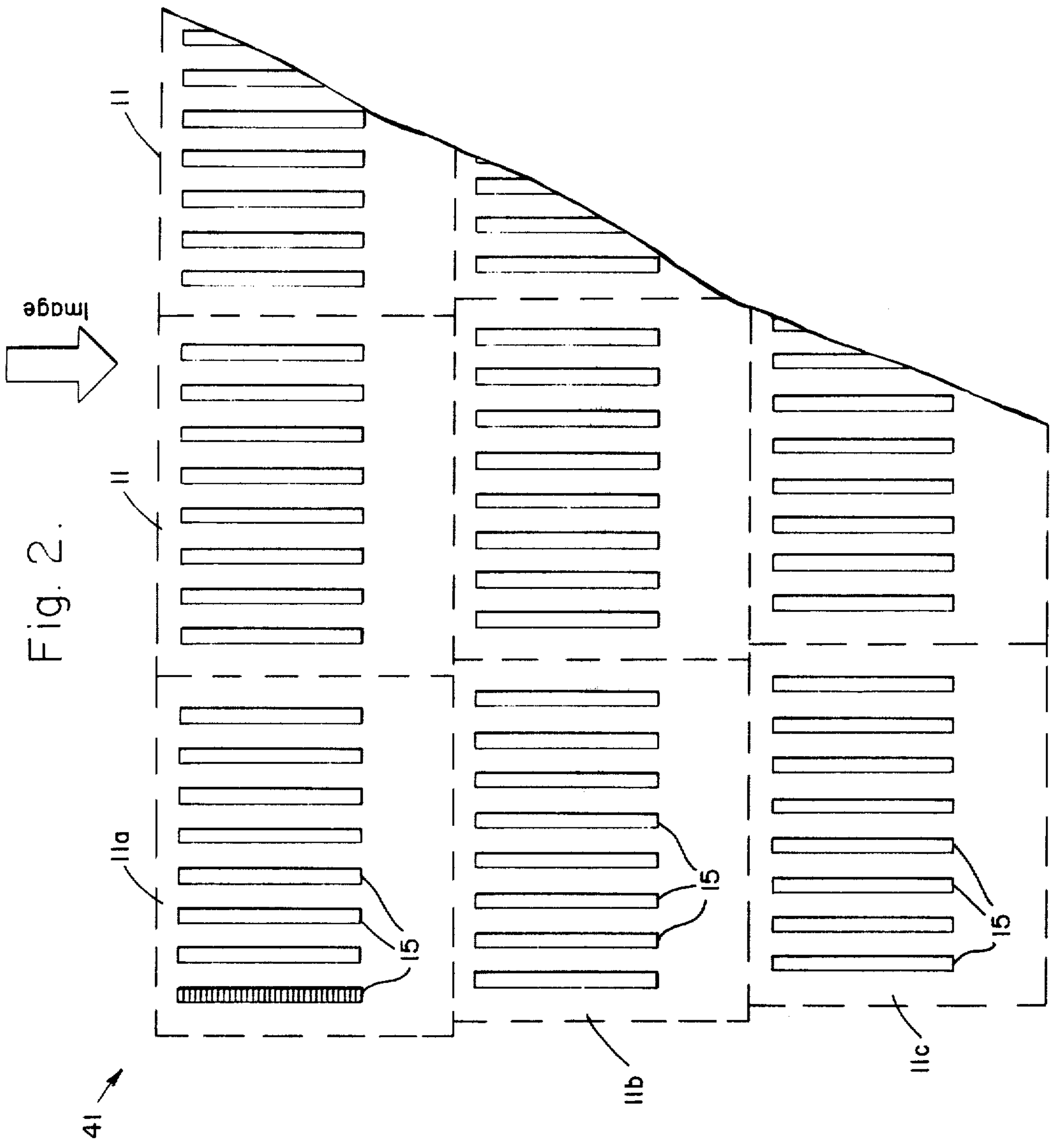
FIG. 2 is a plan view, partially broken away, of a panel made up of a plurality of modules shown in FIG. 1 for collectively detecting an image.

Although the imager module illustrated in FIG. 1 is itself a complex system, it may be combined into a larger mosaic in the manner illustrated in FIG. 2 so as to provide 100% image coverage through interlacing of its spaced apart detector columns 15. Thus, the first segment of an image is collectively picked up by the first column 15 of the successive rows 11*a*, 11*b*, and 11*c* and the next such segment is picked up by the second detector columns in the three rows. The signals from the corresponding columns may then be properly combined, taking into account the fact that a given image is registered at different times by the detector columns in the different rows of imaging modules.

Having set forth the organization and operation of the system shown in FIGS. 1 and 6, there will next be described in some detail the construction of a preferred CCD shift register 21 and a preferred CCD multiplexer 37. Neither is the invention of the present group of applicants, the former being the invention of John Hartman and Darrell Erb, and the latter being the invention of Darrell Erb alone. These inventions are therefore not claimed herein but are claimed instead in the above reference related patent application by those inventors.

Figures 3, 4:
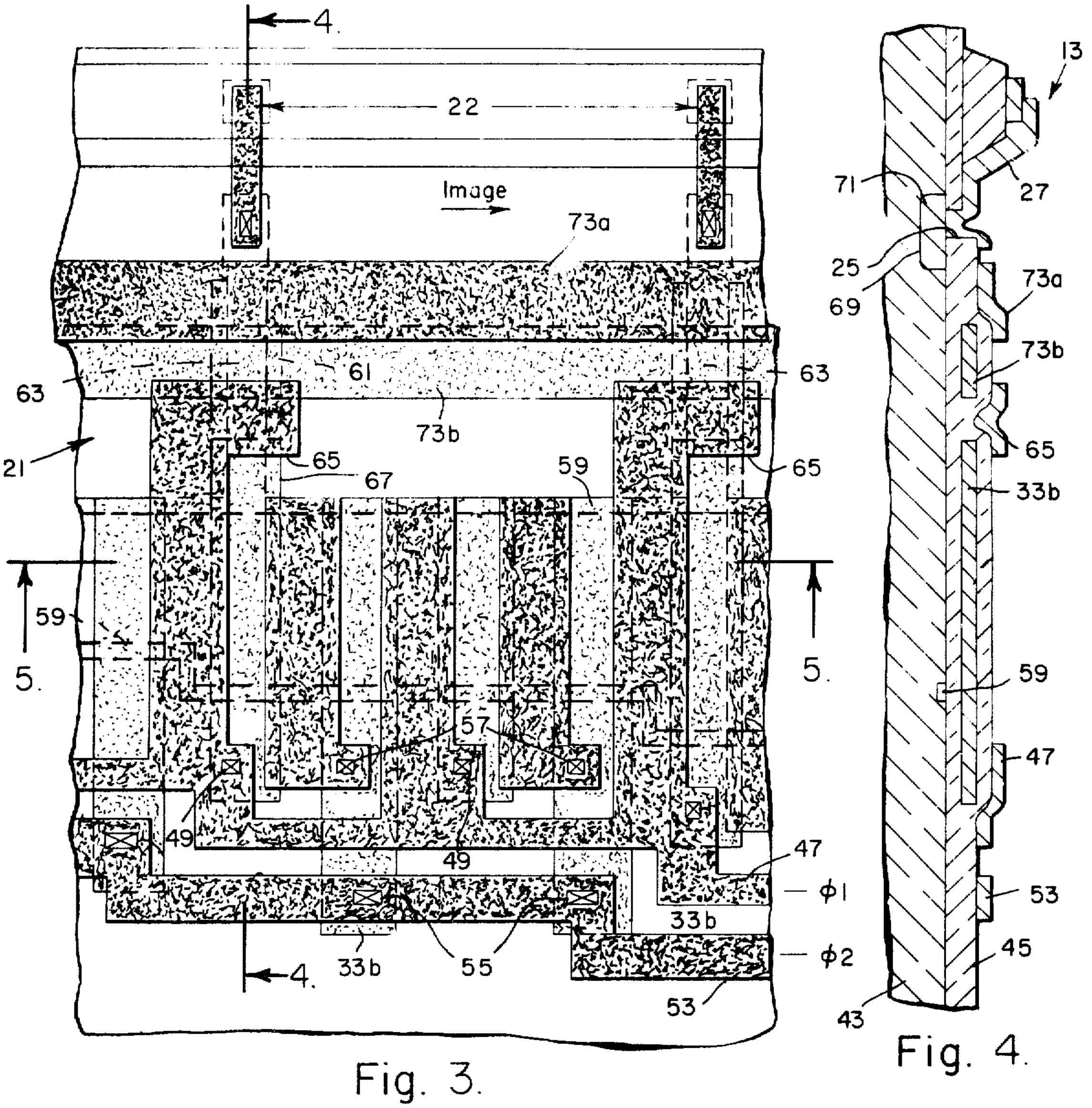
FIG. 3 is a plan view, partially broken away, of a CCD shift register such as that illustrated in FIG. 1.
FIG. 4 is a cross section through FIG. 3 to illustrate the connection between the infrared detectors and the CCD shift registers shown in FIG. 1.

Turning now to FIGS. 3–5, shown there are two stages 22 of a CCD shift register 21, with an IR detector 13 being situated next to each CCD stage. Formed on an N conductivity type substrate 43 is a dielectric layer 45 upon and within which a series of electrodes 33 are distributed in a row. Each CCD stage 22 comprises four such electrodes. Each electrode 33 is made up of a metal transfer electrode 33*a* and buried polycrystalline silicon electrode 33*b*. *In a manner to be explained next,* both portions 33a and 33b of each electrode 33 are electrically connected to the same clock voltage. More particularly, a phase 1 clock voltage (φ1) is applied to the first and third transfer electrodes 33a of each CCD stage 22 by means of a bus 47 which runs the length of the CCD and which is integral with those transfer electrodes. Contact points 49 connect the first and third transfer electrodes 33a to their associated first and third storage electrodes 33b which are located below them and to their immediate right. This connection is indicated by lines 51 in FIG. 5.

A phase 2 (φ2) clock voltage is applied to the second and forth electrodes 33 of each CCD cell by means of a second bus line 53 running generally parallel to the first bus line 47. The phase 2 bus line 53 is connected to the second and fourth storage electrodes 33b through contacts 55. The second and fourth transfer electrodes 33a receive the phase 2 clock voltage through contacts 57 which connect them with the second and fourth storage electrodes 33b. Thus, it is seen that alternate electrodes 33 are energized with opposite ones of the phase 1 and phase 2 clock voltages φ 1 and φ 2.

Running along the CCD is a channel-stopping region 59. With an N-type substrate the channel stop is an N+ doped strip and serves to confine the charge packets being passed by the electrodes 33 to the area defined by the channel stopper. An inlet into each CCD stage 22 is provided by an opening in the channel stopper 59, such opening being defined by extensions 61 which define a channel 63 between a given one of detectors 13 and the CCD stage 22 which is to receive its output. In this regard it will be noted that the first transfer electrode 33a of each CCD stage 22 serves not only to pass charge from the previous CCD stage to its own stage but also to pass charge from the input channel 63 to the first storage electrode 33b of its stage. Similarly, the first storage electrode 33b of each stage 22 serves not only to store successive charge packets passed to it from the preceding CCD stage but also to store initially the charge injected into its stage from its associated IR detector 13. To perform this second function, the first transfer electrode 33a and the first storage electrode 33b of each CCD stage are configured differently from the other such electrodes. The first transfer electrode 33a is L-shaped, with its transverse foot portion 65 extending across the input channel 63. The first storage electrode 33b is provided with an extension 67 so as to reach under the foot 65 of the transfer electrode 33a.

Charge is injected from each detector 13 into the input channel 63 next to it through an injecting junction 69 formed by means of a P+ diffusion 71. An electrical connection is made from the detector 13 to the diffusion 71 through the connecting lead metallization 27, also shown in FIG. 1. Coupling to the extension 65 of the clock transfer electrode 33a is effected by an input electrode structure, formed of an input transfer electrode 73a and an input storage electrode 73b. The input storage electrode 73b is again shown as a buried polycrystalline silicon electrode and the storage electrode 73a is shown to extend along the surface of the dielectric 45 and formed in the same metallization step used to create the other surface electrodes 33a. The input transfer electrode 73a overlaps both the injecting junction 69 and the input storage electrode 73b.

Both the input transfer electrode 73a and the input storage electrode 73b are shown to be formed of an integral conductor running the length of the CCD device 21 and are supplied with biasing voltage $V_{sc}$ and $V_{st}$. It will be noted that the input transfer and storage electrodes 73a and 73b are not shown to be connected together, thereby permitting their voltages to be individually selected. It may be assumed, however, that with the type of electrode structure shown, the two biasing potentials $V_{sc}$ and $V_{st}$ are maintained at the same level, thereby creating a constant potential well under the input electrodes 73a, 73b to permit a constant charge flow from the detector 13 as explained more fully in the above-referenced Hartman-Erb application.

In operation, charge packets are injected from respective ones of the detectors 13 into their associated CCD stages 22. Once such a charge packet reaches the potential well under the first storage electrode 33b in the CCD stage, that charge packet enters the main stream of charge flow in the CCD and is stepped toward the right along successive stages, one stage during each two clock periods. By synchronizing the clock frequency to the rate at which an image is scanned across successive detectors 13, all charges produced by them may be made to arrive at the last CCD stage at the same time. To accomodate the progressively larger charge packets which they need to store, successive CCD stages 22 are made progressively larger, as indicated by the progressive increase in the width of the channel areas defined by the channel stopper 59 in the three stages partially shown in FIG. 3.

Figure 8:
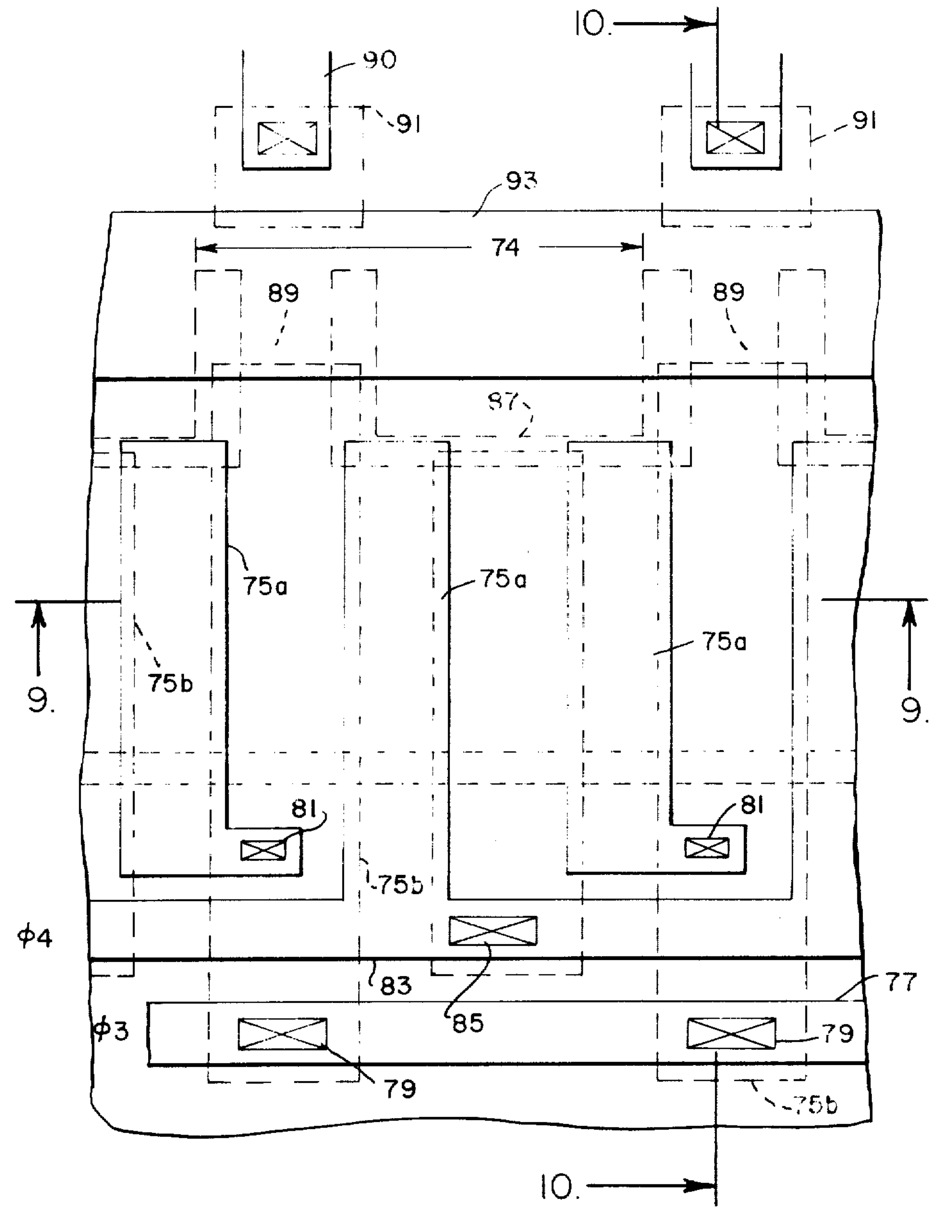
FIG. 8 is a plan view of a multiplexing CCD shown in block form in FIG. 6.
Figure 10:
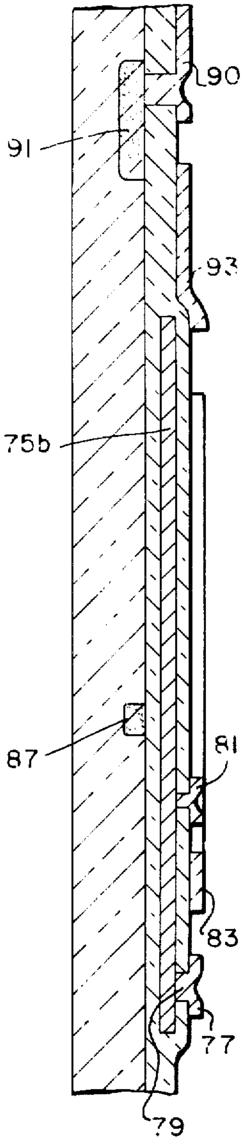
FIG. 10 is a cross section along lines 10—10 through the device shown in FIG. 8.
Figure 9:
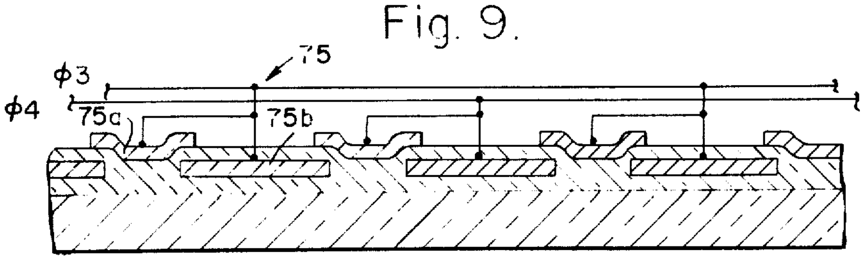
FIG. 9 is a cross section along lines 9—9 through the CCD multiplexer shown in plan view in FIG. 8.

Turning next to FIGS. 8–10, a preferred embodiment for the multiplexing multistage CCD 37 will be described, it being understood that the CCD 37 per se is the sole invention of Darrell Erb in whose referenced application its structure and operation are more fully described. Each stage 74 of the CCD 37 comprises two electrodes 75, made up of a surface electrode 75a and a buried electrode 75b, similar to those explained previously with reference to FIG. 3. A phase 3(φ3) clock voltage is supplied over a bus line 77 directly to the first buried electrode 75b through a contact 79. The clocking voltage φ3 is also supplied to the first surface electrode 75a through a contact 81.

A phase 4(φ4) clocking voltage is supplied over a second bus line 83 from which it is applied to the second surface electrode 75a, with which it is integral, and to the second buried electrode 75b through contact 85.

Charges to be shifted along the multiplexer CCD 37 are maintained in a channel by means of a channel stopper 87 formed by creating an N+ diffusion in the substrate. Inlets 89 are provided into the charge channel through the channel stopper 87 to permit injection of charges into successive stages.

Charges are injected through each at a plurality of injecting junctions 91 along the side of the device into the "stream" of charges which are being stepped toward the right along its electrodes 75. An input coupling electrode 93, shown in the particular embodiment of FIGS. 8–10 as comprising only a single surface electrode, extends as a unitary member between the successive injecting junctions 91 and the CCD electrodes 75 so that the input coupling electrodes of all CCD stages are formed of an integral conducting member. The buried electrode portion 75b of the first electrode 75 in each stage 74 serves both to store charge coming from the injecting junction 91 and to store charge arriving from the preceding stage of the CCD. This is why the buried electrode portion 75*b* extends into the inlet 89.

Figure 11:
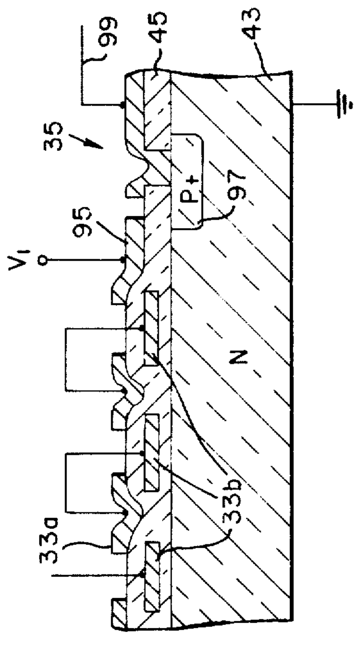
FIG. 11 is a partial cross section through CCD shift register 21-10 of FIG. 6 to show the output stage of the register.

Each stage of the multiplexing CCD 37 receives its input from the output 35 of a respective one of the shift register CCD 21. As best seen in FIGS. 6, 10, and 11, the contact 90 leading to the input junction 91 for each stage of the multiplexing CCD 37 is connected through a conductor 99 to the output 35 of a respective CCD shift register 21. Direct coupling between the output stages 35 and the inputs of the multiplexing CCD 37 is effected, preferably, by providing for each CCD shift register 21 an output electrode 95 which overlaps the last of its storage electrodes 33*b* and its output junction 97. The output electrode 95 is maintained at a potential V1 which may be the lower of the two potentials between which the clocking signals $\phi 1$ and $\phi 1$ alternate.

Figure 7:
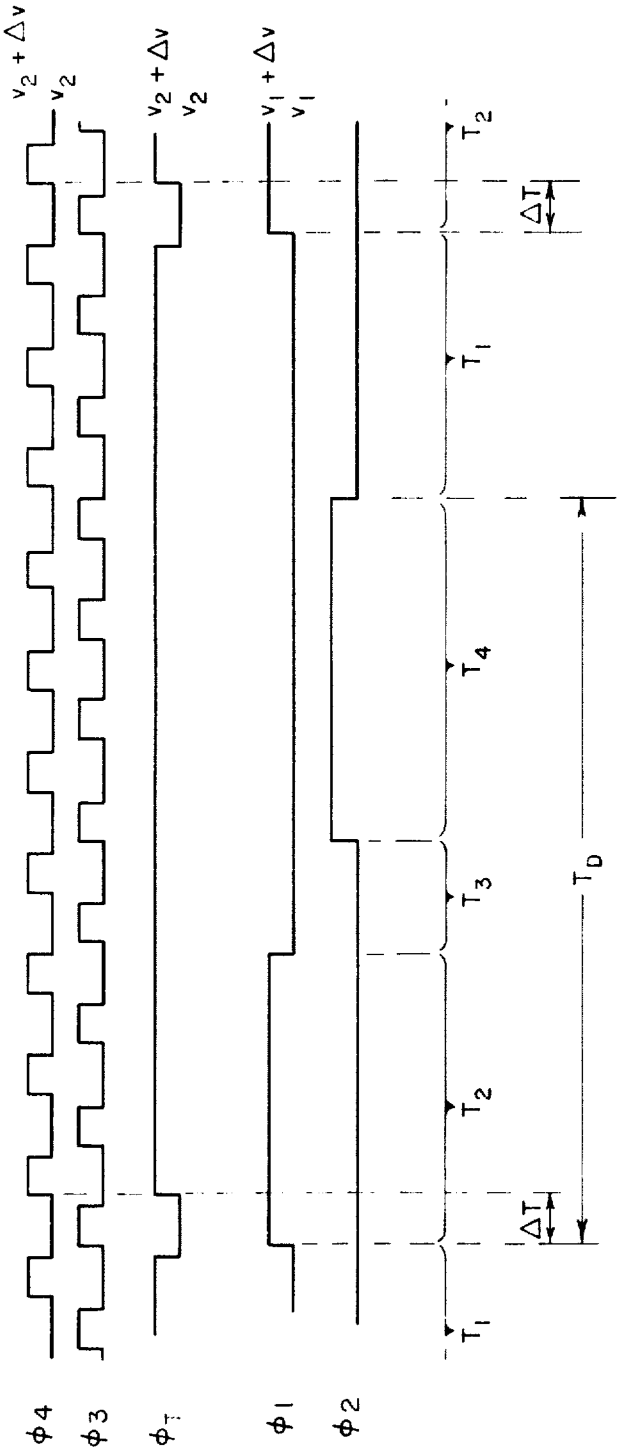
FIG. 7 is a timing diagram to illustrate the operation of the circuit shown in FIG. 6.

The input electrodes of the multiplexing CCD 37 receive an input clocking signal $\phi_T$ as shown in FIG. 7, which alternates between a first relatively long duration potential $V_2+\Delta V$ and a second more negative potential $V_2$ of shorter duration. It is during the latter part of the signal $\phi_T$, marked by the time period $\Delta T$, that changes are transferred directly from the outputs 35 of the CCD shift registers 21 to the respective stages of the multiplexing CCD 37. The manner in which charges may be transferred through such a direct connection from the outputs of the CCD shift registers 21 to the inputs of the multiplexing CCD 37 is explained in detail in the referenced Erb patent application. Thus the time periods $T_1$ through $T_4$ in FIG. 7 of the present application correspond to the time periods so labeled in FIG. 3 of the Erb application. It is sufficient to note here that the clocking voltages $\phi 1$ and $\phi 2$ alternate between a first voltage level V1 and a second voltage level V1 + $\Delta$V, where V1 is the potential being applied to the output electrode 95. Moreover, the clocking voltages $\phi 3$ and $\phi 4$ alternate between a first voltage level V2 and a second voltage level $V_2+\Delta V$, where V2 is the lower of the two potential levels between which the clocking voltage $\phi_T$ alternates. For proper charge transfer to occur, the absolute value of the voltage applied by the electrodes should progressively increase relative to the potential of the substrate, in going from the sending CCD 21 to the receiving CCD 37. This is insured by making the absolute value of the potential V2 slightly higher than that of V1.

In operation, charge is transferred one stage down in the CCD shift registers 21 with each cycle, shown as $T_0$, of the clocking voltages $\phi 1$ and $\phi 2$. Consequently, the charges stored in the output stages 35 are sampled by the clocking voltage $\phi_T$ after each such reversal, following which the charges which have been sampled and thus taken from the outputs 35 into the successive stages of the multiplexing CCD are stepped along by the clocking signals $\phi$'and $\phi 4$. In this manner, once during each time period $T_0$, a set of ten signals appears at the output of the multiplexing CCD 37, representing the ten outputs which had been fed to the CCD during the preceding time period.

The exact configuration of the output of multiplexer CCD 37 is not material to the present invention. For a detailed explanation of a suitable output circuit, reference may be made to FIGS. 1-3 of the above referenced Hartmann-Erb patent application. It is that output circuit which is schematically illustrated in FIG. 6 of the present application.

What has been described is a novel imaging system in which infrared signals are processed in the form of charge packets and in which such charge packets are injected directly from infrared detectors into charge coupled devices and in which the charge packets thus injected are further processed and transferred between charge coupled devices through direct resulting in better performance and simpler construction.

In addition to the foregoing specific preferred embodiment, there are other imager configurations in which the present invention may be used. For example, rather than providing several columns of detectors, each column having associated therewith a separate CCD for collecting charges generated by that column of detectors, the present invention may also be practiced with an imager comprising only a single column of detectors and having only a single CCD associated therewith to collect its generated charges. In this type of configuration the single column of detectors is scanned across the image or vice versa so that each detector scans the same strip portion of the image time after time and each strip portion of the image is always scanned by one and only one of the detectors. In this type of imager, each detector is coupled to a separate stage of the CCD, with each stage having two storage wells. In one storage well a charge is accumulated during the scanning of the image, with the accumulated charge representing the signal produced by the detector in response to the image. The other storage well in each CCD stage serves to periodically receive the accumulated charges in the first storage well so that, in an appropriate instant, the accumulated charges in all stages of the CCD may be read out concurrently for subsequent processing. It will, therefore, be appreciated that the present invention, whereby charges are directly transferred from detectors to respective CCD stages associated therewith may be employed with equal advantage, both in multidetector column array imagers and in single detector column imagers.

What is claimed is:

1. In an imager the combination comprising:

A. An array of infrared detectors, each operable to generate an electrical signal in response to infrared radiation; and B. means for processing said signals, said means including:

1. A charge-coupled signal collecting device comprised of:
   a. a storage medium,
   b. a dielectric layer disposed over a major surface of said medium,
   c. a plurality of electrodes disposed over said dielectric layer for creating in response to voltages applied thereto a succession of potential wells in said storage medium and for passing an electric charge from given ones of said wells to succeeding ones of them,
   d. means d.c. coupled to said detectors for injecting directly into said storage medium next to successive ones of said potential wells, a charge in response to the output of respective ones of said detectors,
2. means for applying voltages to said electrodes so as to step said injected charges through the potential wells of said charge-coupled device, and
3. means coupled to said signal collecting device for reading out said stepped charges.

2. The combination of claim 1 characterized further in that said array includes a plurality of columns and rows of detectors and in that there is a separate said signal collecting device for each column of detectors.

3. The combination of claim 1 characterized further in that successive ones of said potential wells are progressively larger so as to accommodate a progressively larger stored charge so that in response to an image swept over successive ones of said detectors in synchronism with the stepping of said charges, the charge read out of said signal collecting device after the application of said voltages thereto is the sum of said injected charges.

4. The combination of claim 2 characterized further in that said means for reading out charges includes:

a. charge-coupled read-out device comprised of:
   1. a storage medium,
   2. a dielectric layer disposed over a major surface of said medium,
   3. a plurality of electrodes disposed over said dielectric layer for creating in response to voltages applied thereto a succession of potential wells in said storage medium and for passing an electric charge from given ones of said wells to succeeding ones of them,
   4. means d.c. coupled to respective ones of said signal collecting devices for injecting directly into the storage medium of said read-out device next to successive ones of its storage wells the charges previously stepped through respective ones of said signal collecting devices; and b. means for applying voltages to the electrodes of said read-out device so as to step the charges which have been injected into it through its potential wells at a rate higher than the rate at which charges are stepped through the potential wells of said signal collecting devices.

5. In an imager the combination comprising:

a. an array of coplanar IR detectors arranged in columns and rows, each detector operable to generate an electrical signal in response to infrared radiation;

b. a plurality coplanar multistage charge-coupled devices, each associated with a respective column of said detectors, successive stages of each charge-coupled device having means d.c. coupled to said detectors for directly injecting a charge in response to the signal produced by respective detectors in its associated column of detectors;

c. means for scanning an image across said array of detectors so that respective portions of said image are progressively sensed by successive detectors in respective columns of said array;

d. means for shifting said injected charges along said charge-coupled devices in synchronism with the scanning of said image; and e. means for periodically reading out the shifted charges from said charge-coupled devices.

6. The combination of claim 5 characterized further in that:

a. each charge-coupled device is constructed to have a series of potential wells of progressively increasing size; and b. respective image portions are swept fully across said detector array and charges generated in response thereto are stepped fully through said charge-coupled devices prior to each reading out of said charge-coupled devices.

7. The combination of claim 5 characterized further in that said means for reading out the shifted charges from said charge-coupled devices comprises a multistage charge-coupled device, successive stages of said charge-coupled device having means for directly injecting charges from respective ones of said coplanar charge-coupled devices.

8. A solid state imaging module comprising in combination:

a. a planar array of infrared detectors arranged in columns and rows, each detector being operable to generate an electrical signal in response to infrared radiation;

b. a set of multistage charge-coupled devices formed on a single semiconducting substrate, each charge-coupled device being associated with, and located next to, a respective column of said detectors, successive stages of each charge-coupled device having means d.c. coupled to said detectors for directly injecting a charge in response to the signal produced by a respective detector in its associated column of detectors;

c. means for shifting charges injected into said charge-coupled devices a long successive stages thereof at a first rate; and d. means for reading charges out of said charge-coupled devices at a rate which is in integral multiple of said first rate.

9. In an imager the combination comprising:

a. an array of IR detectors arranged in at least a single column;

b. multistage charge coupled device associated with each said column, successive stages of each CCD having means d.c. coupled to said detectors for directly injecting a charge in response to the signal produced by respective detectors in its associated column of detectors;

c. means for scanning an image across said array of detectors; and d. means for periodically reading out the charges from each said multistage charge coupled device.

* * * * *